US009755292B2

(12) United States Patent
Tamiazzo

(10) Patent No.: US 9,755,292 B2
(45) Date of Patent: Sep. 5, 2017

(54) SAME-BAND COMBINER FOR CO-SITED BASE STATIONS

(71) Applicant: CommScope Italy S.R.L., Agrate Brianza (Monza Brianza) (IT)

(72) Inventor: Stefano Tamiazzo, Milan (IT)

(73) Assignee: CommScope Italy, S.r.l. (IT)

(*) Notice: Subject to any disclaimer, the term of this patent is extended or adjusted under 35 U.S.C. 154(b) by 0 days.

(21) Appl. No.: 15/117,839

(22) PCT Filed: Apr. 13, 2015

(86) PCT No.: PCT/IT2015/000105
§ 371 (c)(1),
(2) Date: Aug. 10, 2016

(87) PCT Pub. No.: WO2015/159316
PCT Pub. Date: Oct. 22, 2015

(65) Prior Publication Data
US 2017/0012337 A1 Jan. 12, 2017

(30) Foreign Application Priority Data
Apr. 14, 2014 (IT) .............................. BO2014A0214

(51) Int. Cl.
*H04M 1/00* (2006.01)
*H01P 7/00* (2006.01)
(Continued)

(52) U.S. Cl.
CPC ............ *H01P 5/12* (2013.01); *G06F 17/5009* (2013.01); *H01P 1/207* (2013.01); *H01P 1/2053* (2013.01);
(Continued)

(58) Field of Classification Search
CPC ....... H04B 1/44; H04B 10/2503; H04M 1/00; H01P 1/20; H01P 1/213; H01P 5/12; H03H 7/38; H03H 7/48
(Continued)

(56) References Cited

U.S. PATENT DOCUMENTS 4,504,805 A * 3/1985 Ekelman, Jr. ......... H01P 1/2138
333/126
5,717,405 A * 2/1998 Quan ..................... H01Q 25/02
333/117

(Continued)

FOREIGN PATENT DOCUMENTS

WO WO 2012/025946 A1 3/2012

OTHER PUBLICATIONS

International Search Report and Written Opinion, PCT/IT2016/000105, Sep. 16, 2015, 7 pages.

*Primary Examiner* — Quochien B Vuong
(74) *Attorney, Agent, or Firm* — Myers Bigel, P.A.

(57) ABSTRACT

The invention is a compact three-port signal combiner suitable for use in a base station having two different wireless systems. The combiner is designed as a four-port network, but one of the ports is terminated with a predetermined load, thus leaving three ports for connection to user equipment. A first port (A) receives from an antenna a first input signal comprising first and second receive bands and transmits to the antenna a first output signal comprising a transmit band. A second port (R), connected to the first wireless system, outputs to the first wireless system a second output signal comprising the first and second receive bands. A third port (T\R) outputs, to the second wireless system, a third output signal comprising the first and second receive (Continued)

bands and receives from the second wireless system a second input signal that is to be transmitted from the first port.

20 Claims, 11 Drawing Sheets

(51) Int. Cl.
*H01P 5/12* (2006.01)
*H01P 1/205* (2006.01)
*G06F 17/50* (2006.01)
*H01P 1/207* (2006.01)
*H01P 11/00* (2006.01)
*H01P 1/20* (2006.01)
*H04W 88/08* (2009.01)

(52) U.S. Cl.
CPC ........ *H01P 11/007* (2013.01); *G06F 2217/16* (2013.01); *H01P 1/20* (2013.01); *H04W 88/08* (2013.01)

(58) Field of Classification Search
USPC ..... 455/73, 78, 269, 272, 273, 277.1, 277.2, 455/561, 562; 333/124, 126, 132, 167, 333/175, 219
See application file for complete search history.

(56) References Cited

U.S. PATENT DOCUMENTS

| | | | |
|---|---|---|---|
| 7,408,427 B1* | 8/2008 | Lee-Yow | H01P 1/161 333/126 |
| 7,606,184 B2* | 10/2009 | Liu | H03H 7/463 370/297 |
| 7,945,300 B2* | 5/2011 | Kayano | H01P 1/20 333/202 |
| 2008/0076360 A1* | 3/2008 | Curtin | H04B 1/0067 455/78 |
| 2011/0051628 A1 | 3/2011 | Cohen et al. | |
| 2011/0069644 A1 | 3/2011 | Kim et al. | |

* cited by examiner

500

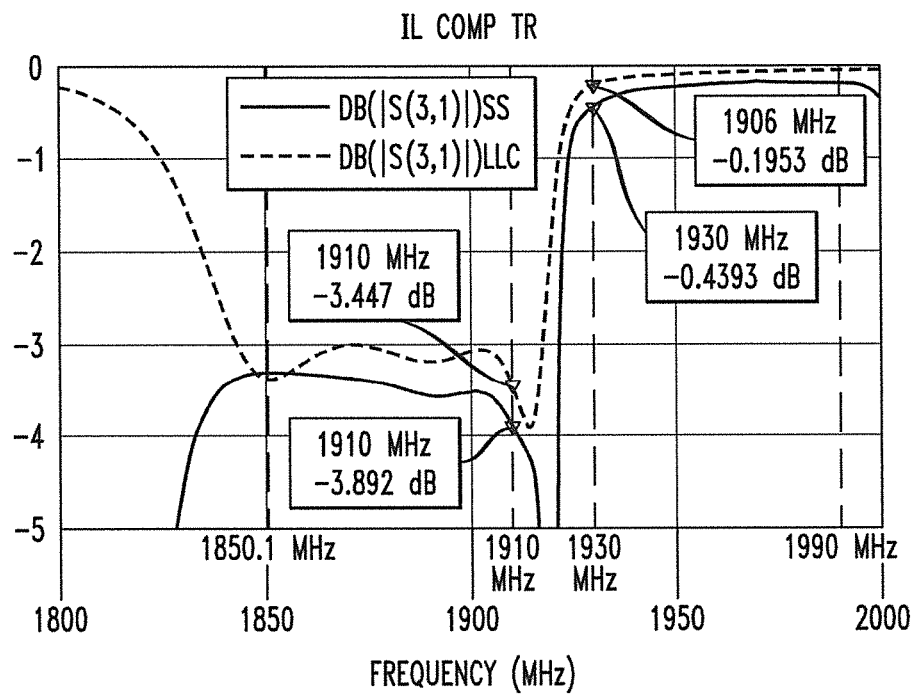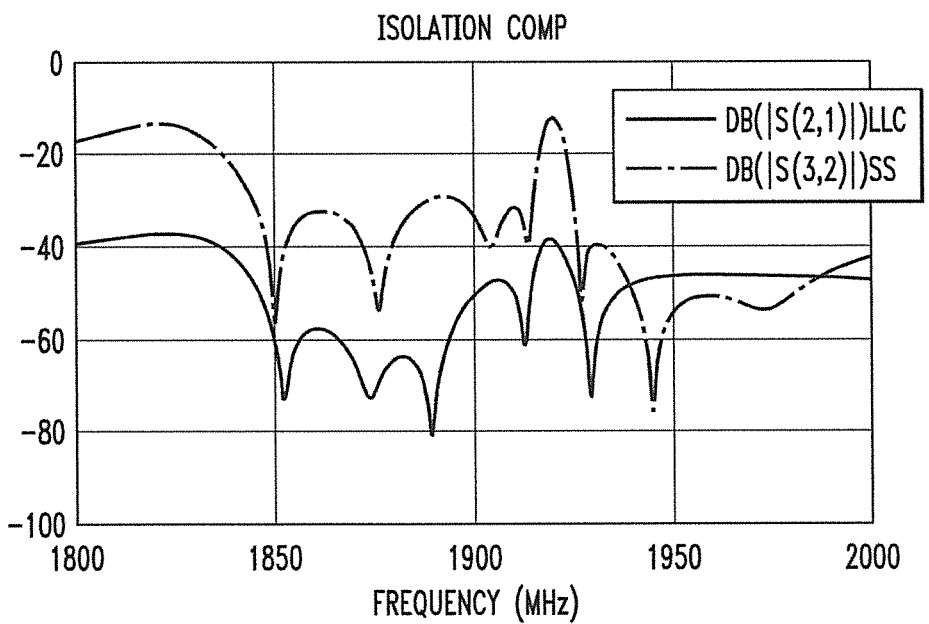

1600

$jB_k = s + jb_k$

1700

1800

SAME-BAND COMBINER FOR CO-SITED BASE STATIONS

RELATED APPLICATIONS

This application is a 35 U.S.C. §371 national stage application of PCT Application No. PCT/IT2015/000105, filed on Apr. 13, 2015, which claims priority from Italian Patent Application No. B02014A000214 filed on Apr. 14, 2014, the contents of which are incorporated herein by reference in their entireties. The above-referenced PCT International Application was published in the English language as International Publication No. WO 2015/159316 A1 on Oct. 22, 2015.

BACKGROUND OF THE INVENTION

Field of the Invention

The present invention relates to electrical signal combiners and splitters, especially, but not exclusively, signal combiners and splitters for sharing signals between two different wireless systems at a wireless base station.

Description of the Related Art

Modern wireless base stations often use one or more three-port antenna line devices (such as low-loss combiners, same-band combiners, filter combiners, or hybrid combiners), in order (i) to share received (RX) signals from two diversity antennas between two different wireless systems operating in the same site, and also (ii) to provide a path for signals to be transmitted (a.k.a. TX signals). See, e.g., U.S. Patent Publication Nos. US 2013/0162374 A1; US 2013/0077540 A1; US 2012/0249263 A1; US 2011/0051628 A1; US 2008/0174385 A1; US 2008/0169878 A1; U.S. Pat. No. 8,305,941 B2; PCT International Publication No. PCT/US2005/029858; and European Patent Publication Nos. EP 1243147 B1; EP 1096818 A1; and EP 0715786 B1, the disclosures of which references are hereby incorporated by reference. Prior-art combiners, however, tend to be relatively large and expensive and to have high insertion and return losses.

SUMMARY OF THE INVENTION

In one embodiment, the invention is a compact signal combiner for use in a base station having at least two different wireless systems. A first port is configured to receive a first input signal comprising first and second receive bands and to transmit a first output signal comprising a transmit band. A second port is configured to output a second output signal comprising one of the first and second receive bands. A third port is configured to output a third output signal comprising an other one of the first and second receive bands and to receive a second input signal that is to be transmitted from the first port as the first output signal. A load forms a fourth port in a four-port network comprising the first, second, and third ports. A plurality of resonators within a plurality of chambers are arranged in a constant-impedance-bandwidth configuration. A first transmission line couples the first and third ports to each other and to at least one of the plurality of resonators. A second transmission line couples the second port and the load to each other and to at least an other one of the plurality of resonators.

In a further embodiment, the resonators and chambers of the compact signal combiner have a structure based on filter parameters that are determined based on a scattering matrix having constituent polynomials $F_1$ and $F_2$, and constituent polynomials $F_1$ and $F_2$ are different and are determined based on characteristic polynomials of a prototype base filter. The prototype base filter is one of a low-pass filter, a bandpass filter, a bandpass-reject filter, a stop-band filter, a high-pass filter, a high-pass reject filter, a Type I low-pass Tchebycheff equi-ripple filter, an inverse-Tchebycheff filter, a Butterworth lowpass filter, a Tchebycheff Type II lowpass filter, and an elliptic filter.

In a further embodiment, the resonators and chambers have a structure based on filter parameters that are determined based on a scattering matrix S specified according to the following equation:

$$S = \begin{pmatrix} 0 & 0 & F_1 & P \\ 0 & 0 & P & F_2 \\ F_1 & P & 0 & 0 \\ P & F_2 & 0 & 0 \end{pmatrix} \bigg/ E.$$

where $F_1$, $F_2$, $P$, and $E$ are constituent polynomials in the variable $s=j\omega$, $\omega$ being frequency, and the constituent polynomials $F_1$, $F_2$, $P$, and $E$ are determined based on characteristic polynomials of a prototype base filter.

In a further embodiment, the constituent polynomials $F_1$, $F_2$, $P$, and $E$ are computed from $F_n$, $P_n$, and $E_n \epsilon$ using the following equations:

$$F_n = j^{-N} \prod_{i=1}^{N} (s - zr_i) = j^{-N} \prod_{i=1}^{N} (s + zr_i^*)$$

$$P_n = j^{-N_p} \prod_{i=1}^{N_p} (s - zt_i) = j^{-N_p} \prod_{i=1}^{N_p} (s + zt_i^*),$$

$$E_n = j^{-N} \prod_{i=1}^{N} (s - p_i)$$

where $N$ is the base-filter degree, $N_p$ is the number of transmission zeros of the base filter, $\{p_i\}$ is the set of poles of the base filter (with $i=1, \ldots, N$), $\{zr_i\}$ is the set of reflection zeros (with $i=1, \ldots, N$), $\{zt_i\}$ is the set of transmission zeros (with $i=1, \ldots, N_p$), $\epsilon$ is a constant related to the return loss RL of the base filter, $F_n$, $P_n$, and $E_n$ are the characteristic polynomials of the base filter, and the operator * is the complex para-conjugate operator; and $$F_1 = F_n + P_n/\epsilon$$

$$F_2 = F_n - P_n/\epsilon$$

$$P = \alpha P_n/\epsilon$$

and $$|E|^2 = (F_n + \sqrt{1+\alpha^2} P_n/\epsilon)(F_n - \sqrt{1+\alpha^2} P_n/\epsilon)$$

with $$\alpha = \sqrt[4]{\frac{1}{1 - 10^{-RL/10}}}.$$

In a further embodiment, the first port (e.g., A, 710, 1216) is connected to the second port (e.g., R, 712, 1218) by a first path having an insertion loss in the first and second receive bands that is less than 4 dB. The first port (e.g., A, 710, 1216) is connected to the third port (e.g., T/R, 720, 1220) by a second path having an insertion loss in the first and second receive bands that is less than 4 dB. The second port and the third port are connected by a third path having an insertion loss in the transmit band and in the first and second receive bands that is at least a 30 dB, such that the second port and the third port are substantially isolated from each other in the transmit band and the receive bands.

In a further embodiment, the second output signal from the second port (e.g., R, 712, 1218) comprises both the first receive band and the second receive band, and the third output signal from the third port (e.g., T/R, 720, 1220) comprises both the first receive band and the second receive band.

In another embodiment, the invention is a wireless base station. The wireless base station comprises: first user equipment configured for wireless communication according to a first wireless protocol (e.g., GSM-850); second user equipment configured for wireless communication according to a second wireless protocol (e.g., UMTS-850); a signal combiner as described above, connected to both the first user equipment and the second user equipment; and an antenna unit connected to the signal combiner.

In another embodiment, the invention is a method for designing and constructing a three-port signal combiner. A four-port scattering matrix S is determined based on predetermined filter characteristics. An expanded admittance matrix $Y_e$ is determined from the scattering matrix S. A transversal coupling matrix is determined based on the expanded admittance matrix $Y_e$. The transversal coupling matrix is re-arranged to produce a filter-parameter matrix conforming to a four-port coupled-resonator filter topology. Physical parameters of a four-port resonant-cavity filter are selected based on the filter-parameter matrix. The four-port resonant-cavity filter having the selected physical parameters is constructed. One of the four ports of the four-port resonant-cavity filter is suitable for connection to a load, such that, when the load is connected, the four-port resonant-cavity filter operates as a three-port signal combiner.

In a further embodiment, the four-port scattering matrix comprises constituent polynomials $F_1$ and $F_2$ that are different and are determined based on characteristic polynomials of a prototype base filter, and the prototype base filter is one of a low-pass filter, a bandpass filter, a bandpass-reject filter, a stop-band filter, a high-pass filter, a high-pass reject filter, a Type I low-pass Tchebycheff equi-ripple filter, an inverse-Tchebycheff filter, a Butterworth lowpass filter, a Tchebycheff Type II lowpass filter, and an elliptic filter.

In a further embodiment, a predetermined load is connected to one of the ports of the four-port resonant-cavity filter, thus converting the four-port resonant-cavity filter to a three-port signal combiner.

In a further embodiment, the four-port coupled-resonator filter topology is a constant-impedance-band configuration.

In a further embodiment, the four-port scattering matrix S is specified according to the following equation:

$$S = \begin{pmatrix} 0 & 0 & F_1 & P \\ 0 & 0 & P & F_2 \\ F_1 & P & 0 & 0 \\ P & F_2 & 0 & 0 \end{pmatrix} / E,$$

where $F_1$, $F_2$, P, and E are constituent polynomials in the variable $s=j\omega$, $\omega$ being frequency, and the constituent polynomials $F_1$, $F_2$, P, and E are determined based on characteristic polynomials of a prototype base filter.

In a further embodiment, the constituent polynomials $F_1$, $F_2$, P, and E are computed from $F_n$, $P_n$, and $E_n$ using the following equations:

$$F_n = j^{-N} \prod_{i=1}^{N} (s - zr_i) = j^{-N} \prod_{i=1}^{N} (s + zr_i^*)$$

$$P_n = j^{-N_p} \prod_{i=1}^{N_p} (s - zt_i) = j^{-N_p} \prod_{i=1}^{N_p} (s + zt_i^*),$$

$$E_n = j^{-N} \prod_{i=1}^{N} (s - p_i)$$

where N is the base-filter degree, $N_p$ is the number of transmission zeros of the base filter, $\{p_i\}$ is the set of poles of the base filter (with i=1, . . . , N), $\{zr_i\}$ is the set of reflection zeros (with i=1, . . . , N), $\{zt_i\}$ is the set of transmission zeros (with i=1, . . . , $N_p$), $\epsilon$ is a constant related to the return loss RL of the base filter, $F_n$, $P_n$, and $E_n$, are the characteristic polynomials of the base filter, and the operator * is the complex para-conjugate operator; and $$F_1 = F_n + P_n/\epsilon$$

$$F_2 = F_n - P_n/\epsilon$$

$$P = \alpha P_n/\epsilon$$

and $$|E|^2 = (F_n + \sqrt{1+\alpha^2} P_n/\epsilon)(F_n - \sqrt{1+\alpha^2} P_n/\epsilon)$$

with $$\alpha = \sqrt[4]{\frac{1}{1 - 10^{-RL/10}}}.$$

In another embodiment, the invention is a wireless base station comprising first user equipment configured for wireless communication according to a first wireless protocol (e.g., GSM-850); second user equipment configured for wireless communication according to a second wireless protocol (e.g., UMTS-850); a signal combiner constructed in accordance with the method for designing and constructing a three-port signal combiner described above, connected to both the first user equipment and the second user equipment; and an antenna unit connected to the signal combiner.

BRIEF DESCRIPTION OF THE DRAWINGS

The above embodiments and additional embodiments are described in the following detailed description, the appended claims, and the accompanying drawings in which like reference numerals identify similar or identical elements.

FIG. 10 is a graph showing the simulated insertion loss of the combiner embodiment shown in FIG. 7.

FIG. 11 is a graph comparing the simulated port-to-port isolation of the three-port combiner of FIG. 2 with the simulated port-to-port isolation of the combiner embodiment shown in FIG. 7.

DETAILED DESCRIPTION

Section 1—Introduction

Figure 1:
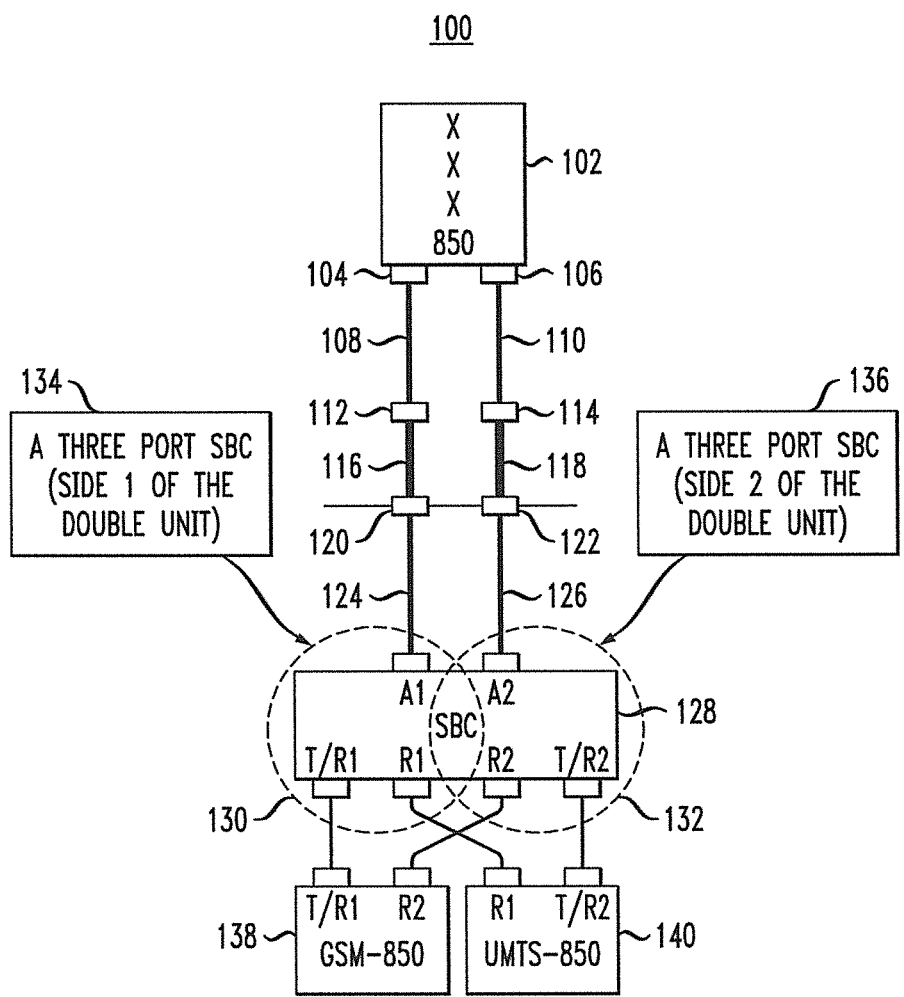
FIG. 1 is an equipment-level block diagram depicting a dual-antenna, dual-system base station.

FIG. 1 illustrates base station 100 comprising a dual-antenna unit 102 comprising ports 104, 106 connected to dual-system combiner 128 through conductors 108, 110, 116, 118, 128, 130 and intermediate connectors 112, 114, 120, 122. Dual-system combiner 128 comprises two band-combining portions 130, 132 that are mechanically coupled but electrically isolated from one another. Band-combining portions 130, 132 comprise three-port combiners 134, 136, respectively, each of which may be, e.g., a same-band combiner, low-loss combiner, hybrid combiner, or filter combiner. Combiner 134 is connected to port 104 of dual-antenna unit 102, and combiner 136 is connected to port 106.

Combiner 134 comprises (i) transmit-and-receive port T/R1 connected to base-station user equipment 138 that is adapted for wireless communication according to a first wireless protocol (e.g., GSM-850) and (ii) receive port R1 connected to base-station user equipment 140 that is adapted for wireless communication according to a second wireless protocol (e.g., UMTS-850). Similarly, combiner 136 comprises (i) transmit-and-receive port T/R2 connected to base-station user equipment 140 and (ii) receive port R2 connected to base-station user equipment 138.

In one embodiment, for given transmit (TX) and receive (RX) operating bands, each of combiners 134, 136 has the following characteristics:

The combiner has three ports labeled A, T/R and R.

Ports A and T/R are matched at all TX and RX frequencies.

Port R is matched at all RX frequencies to the reference load (e.g., a conventional 50-ohm impedance) of the corresponding input port of the downstream base-station user equipment 138, 140.

The path from port T/R to port A has a low insertion loss in each TX band (e.g., from about 0.3 dB to about 0.5 dB) and an insertion loss in each RX band (e.g., less than about 4 dB).

The path from port R to port A has an insertion loss in each RX band that is less than about 4 dB.

The path from port R to port T/R has at least about a 30-dB isolation at all TX and RX frequencies.

Section 2—Conventional Approach

Figure 2:
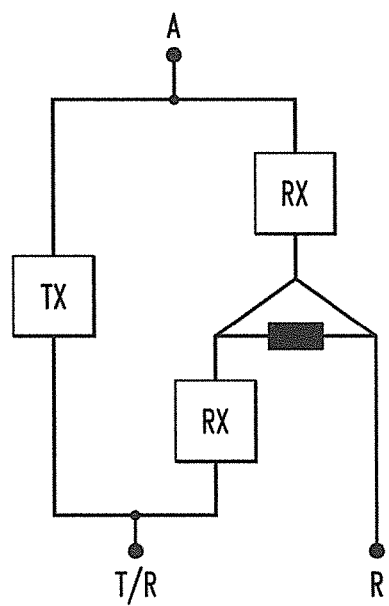
FIG. 2 is a block diagram of a three-port combiner in the base station of FIG. 1.

The conventional architecture used in realizing such a device is shown in FIG. 2 and involves using three (or sometimes four) filters plus a splitter.

In order to meet the isolation requirement, the TX filter is usually designed to have a 25-30 dB rejection in the RX band, and similarly the two RX filters are usually designed to have a 25-30 dB rejection in the TX band.

Section 3—New Approach

Figure 3:
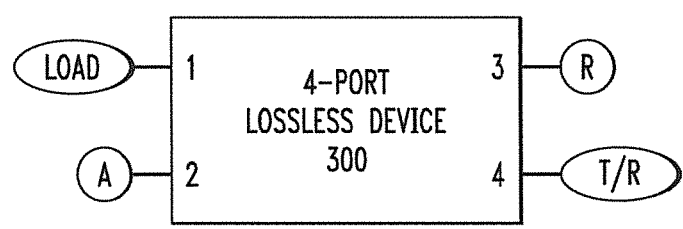
FIG. 3 is a block diagram of a four-port combiner suitable for use in the base station of FIG. 1 in accordance with an embodiment of the invention.

The new approach is based on the synthesis of a novel lossless four-port device 300, depicted in FIG. 3, as a lossless four-port network having a first port (port 1) connected to a predetermined load, such as a 50-ohm load connected to ground (or, alternatively, to another supply voltage, such as supply voltage VSS). Four-port device 300 is further configured such that the functions of the remaining three ports are similar to the functions of the ports in a three-port band combiner. In one embodiment, therefore, four-port device 300 is a same-band combiner. In another embodiment, four-port device 300 is a low-loss combiner.

Polynomial Characterization

In one embodiment, four-port device 300 comprises either a discrete-element filter structure or a distributed-element filter structure having parameters that are selected according to a 4×4 scattering matrix S specified according to Equation (1) as follows:

$$S = \begin{pmatrix} 0 & 0 & F_1 & P \\ 0 & 0 & P & F_2 \\ F_1 & P & 0 & 0 \\ P & F_2 & 0 & 0 \end{pmatrix} \Big/ E. \tag{1}$$

In Equation (1), $F_1$, $F_2$, P, and E are constituent polynomials in the variable $s=j\omega$, where $\omega$ is frequency. In one embodiment, constituent polynomials $F_1$, $F_2$, P, and E are determined by first calculating characteristic polynomials of a prototype base filter. The prototype base filter may be any prototype filter, including but not limited to a low-pass, bandpass, bandpass-reject (also known as stop-band), high-pass, and high-pass reject filter. The embodiments below use a Type I low-pass Tchebycheff equi-ripple filter (also known as an inverse-Tchebycheff filter), but other types may also be used, including but not limited to a Butterworth lowpass filter, a Tchebycheff Type II lowpass filter, and an elliptic filter.

More specifically, based on the desired bandpass-filter response characteristics, a filter designer identifies one or more upper-stopband, transmission-zero frequencies and one or more passband reflection-zero frequencies for the base filter.

Next, the filter designer mathematically characterizes the base-filter response using a rational (lumped-element) lossless model for the scattering parameters $S_{11}$ and $S_{21}$ of the base filter. Base-filter scattering parameters $S_{11}$ and $S_{21}$ filter are calculated according to the following equations:

$$S_{11} = S_{22} = \frac{F_n}{E_n} \quad (2)$$

$$S_{21} = \frac{P_n/\varepsilon}{E_n},$$

with $$F_n = j^{-N} \prod_{i=1}^{N} (s - zr_i) = j^{-N} \prod_{i=1}^{N} (s + zr_i^*)$$

$$P_n = j^{-N_p} \prod_{i=1}^{N_p} (s - zt_i) = j^{-N_p} \prod_{i=1}^{N_p} (s + zt_i^*)$$

$$E_n = j^{-N} \prod_{i=1}^{N} (s - p_i),$$

where N is the base-filter degree, $N_p$ is the number of transmission zeros of the base filter, $\{p_i\}$ is the set of poles of the base filter (with i=1, . . . , N), $\{zr_i\}$ is the set of reflection zeros (with i=1, . . . , N), $\{zt_i\}$ is the set of transmission zeros (with i=1, . . . , $N_p$), $\varepsilon$ is a constant related to the return loss RL of the base filter, $F_n$, $P_n$, and $E_n$ are the characteristic polynomials of the base filter, and the operator * is the complex para-conjugate operator, as described in Richard J. Cameron et al., *Microwave Filters for Communication Systems*, p. 208 (2007), the teachings of which reference are hereby incorporated by reference in their entirety. In Equation (2), it is assumed that the set $\{zr_i\}$, i=1, . . . , N of the reflection zeros is pure imaginary and that the set $\{zt_i\}$, i=1, . . . , $N_p$ of the transmission zeros exhibits para-conjugate symmetry, in order to achieve the lossless condition of the base-filter, which is a two-port network. The constant $\varepsilon$ is pure imaginary and is related to return loss RL of the base filter according to the following equation:

$$\varepsilon^2 = \frac{1}{10^{RL/10} - 1} \left| \frac{F_n}{P_n} \right|^2 \bigg|_{s=j}$$

The constituent polynomials $F_1$, $F_2$, P and E of the four-port network are then computed from $F_n$, $P_n$, and $\varepsilon$ using the relations of the following Equations (3) and (4):

$$F_1 = F_n + P_n/\varepsilon$$

$$F_2 = F_n - P_n/\varepsilon$$

$$P = \alpha P_n/\varepsilon \quad (3)$$

and $$|E|^2 = (F_n + \sqrt{1+\alpha^2} P_n/\varepsilon)(F_n - \sqrt{1+\alpha^2} P_n/\varepsilon) \quad (4)$$

with $$\alpha = \sqrt[4]{\frac{1}{1 - 10^{-RL/10}}}.$$

Relations (3) and (4) are the basic design equations of the new approach.

Given the constituent polynomials $F_1$, $F_2$, P, and E of the four-port network, the designer then synthesizes and determines a physical geometry for an implementation of four-port device 300.

Section 4—Comparison Between the Two Approaches

The new architecture is believed to be superior to the conventional one in many ways. To quantify the differences, consider the following example:
 RX band: 1850 to 1910 MHz
 TX band: 1930 to 1990 MHz
 Isolation between R and T/R ports: at least 30 dB in RX and TX bands.

A conventional combiner might include two RX filters and one TX filter plus a Wilkinson splitter. The design parameters for the two RX filters, for example, would be as follows:
 4 cavities with 2 transmission zeros (TZ) at 1917 MHz and 1945 MHz,
 A return loss RL of 25 dB in the 1845-to-1915-MHz band, and
 A filter quality Q0 equal to 3000.

The design parameters for the TX filter, for example, would be as follows:
 4 cavities with 1 transmission zero at 1912 MHz,
 A return loss RL of 25 dB in the 1925-to-1995-MHz band, and
 A filter quality Q0 equal to 3000.

Figure 4:
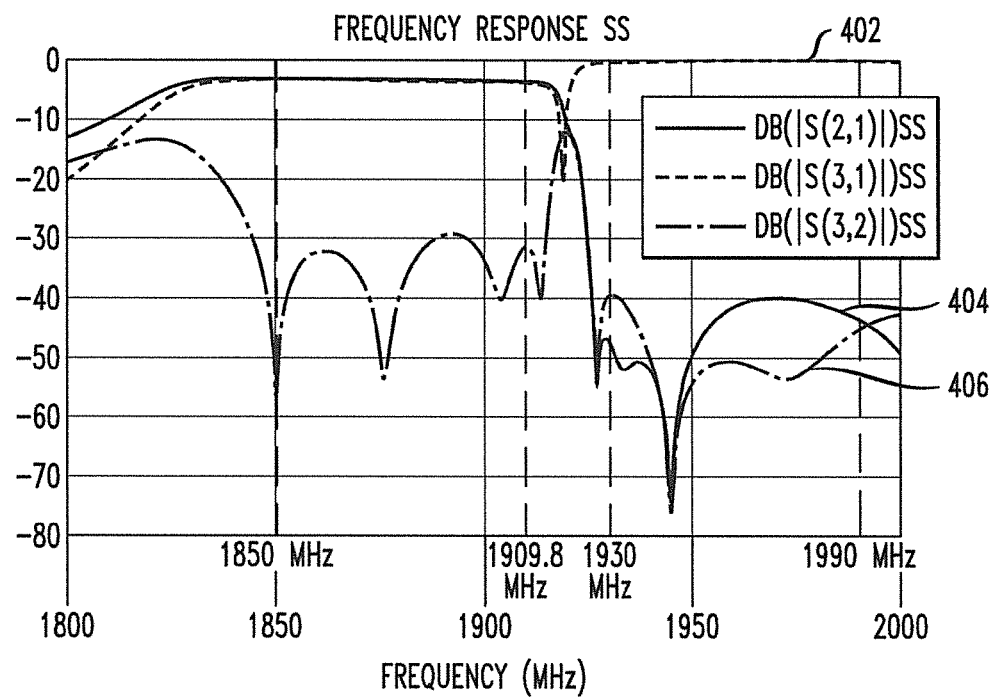
FIG. 4 is a graph showing a simulated frequency response of the three-port combiner of FIG. 2.

The estimated frequency response for the conventional approach is shown in FIG. 4, where the dashed line 402 is the path from port A to port T/R; the solid line 404 is the path from port R to port A; and the long-and-short-dashed line 406 is the isolation curve (path from port R to port T/R). The horizontal axis in FIG. 4 represents the frequency in megahertz, and the vertical axis represents normalized signal power in decibels.

Figure 5:
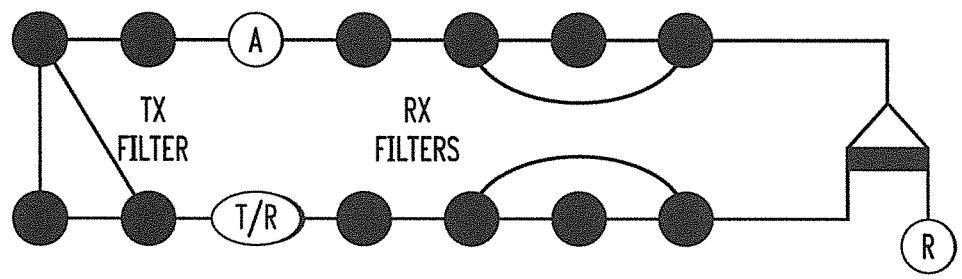
FIG. 5 is a coupling diagram for an embodiment of the three-port combiner of FIG. 2.

FIG. 5 shows a routing diagram for a same-band combiner 500 according to the conventional design, with resonators represented by black dots and couplings between resonators by the solid lines. In total, twelve resonators are needed to implement same-band combiner 500.

In contrast, in order to design a combiner (e.g., a same-band combiner or low-loss combiner) in accordance with the new approach, in a first step, the parameters of the Tchebycheff equi-ripple base filter are selected according to the following requirements:
 3 cavities with 1 transmission zero at 1929 MHz,
 Improved return loss RL of 10 dB in the 1845-to-1915-MHz band, and
 A quality Q0 of 3000.

The corresponding characteristic base-filter polynomials, which are then calculated in accordance with Equation (2) above, are given by:

$$F_n = (s+0.7967i)(s-0.2821i)(s-0.9i)$$

$$P_n = (s-1.4i)$$

$$\varepsilon = 1.5865i \quad (4a)$$

Figure 6:
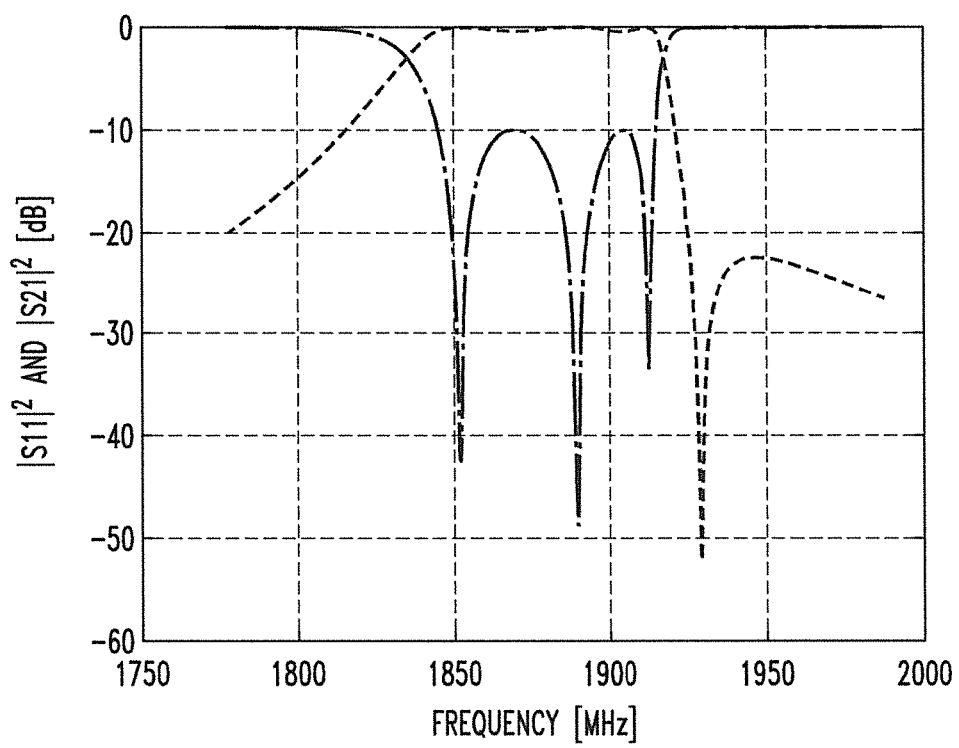
FIG. 6 is a graph showing the frequency response of a base filter of the four-port combiner of FIG. 3.

FIG. 6 shows the base-filter response given by the above base-filter polynomials. In FIG. 6, the long-and-short-dashed line represents the base-filter scattering parameter $S_{11}$ of the base filter, and the dashed line represents base-filter scattering parameter $S_{21}$ of the base filter.

In a second step, the constituent polynomials $F_1$, $F_2$, P, and E needed to construct the scattering matrix of Equation (1) of the four-port network are computed using Equations (3) and (4) as follows:

$F_1 = (s-0.5051+0.02050i)(s+0.6455-0.4036i)(s-0.1404-1.0371i)$ $F_2(s+0.5051+1.0205i)(s-0.6455-0.4036i)(s+0.1404-1.0371i)$ $P = \alpha(s-1.4i)/\epsilon$ $\epsilon = 1.5865i$ $\alpha = 1.0267$ $E = (s+0.6309+1.1212i)(s+0.7887-0.464i)(s+0.1578-1.0775i)$ (4b)

In a third step, 4-port network synthesis is performed based on the above constituent polynomials, in order to identify a resonator topology that is capable of implementing the polynomial equations. The network synthesis may be performed, e.g., in accordance with transversal-synthesis techniques known to those of ordinary skill in the art. See, e.g., Richard J. Cameron et al., *Microwave Filters for Communication Systems* (2007); R. J. Cameron, "Advanced Coupling Matrix Synthesis Techniques for Microwave Filters," IEEE Trans. Microwave Theory Tech., vol 51, no. 1 (2003); R. J. Cameron, "General Coupling Matrix Synthesis Methods for Chebyshev Filtering Functions," IEEE Trans. Microwave Theory Tech., vol. 47, pp. 433-442 (1999); R. J. Cameron, "General Prototype Network Synthesis Method For Microwave Filters," ESA J. 6, 193-206 (1982); R. J. Cameron et al., "Asymmetric Realizations for Dual-mode Bandpass Filters," IEEE Trans. Microwave Theory Tech., vol. MTT-29, pp. 51-58 (1981); and R. J. Cameron, "A Novel Realization for Microwave Bandpass Filters," ESA J. 3, 281-287 (1979), each of which is hereby incorporated by reference in its entirety. See also Rhodes et al., "Explicit Design of Remote-Tuned Combiner for GSM and WCDMA signals," Int. J. Circ. Theor. Appl. 35:547-564 (2007), which is also incorporated by reference in its entirety.

For example, from the four-port scattering parameters in the scattering matrix S of Equation (1), a computation of the admittance parameters Y and their residuals' expansions is performed. A filter designer then builds the transversal coupling matrix and algebraically manipulates the transversal coupling matrix to obtain one or more coupled-resonator filter topologies, such as a constant-impedance-band (CIB) topology. A four-port physical implementation of the resulting filter parameters is then created based on the selected topology and the calculated filter parameters, e.g., using coupled-resonator cavity-based filter technology. Port 4 can then be terminated in a matched load to yield the final three-port combiner structure.

Admittance Matrix and Transversal Network

Once the scattering matrix S is known, then the admittance matrix Y can be computed in the form of a polynomial ratio with a common denominator d:

$$Y = \begin{bmatrix} n_{11} & n_{21} & n_{31} & n_{41} \\ n_{21} & n_{11} & n_{41} & n_{31} \\ n_{31} & n_{41} & n_{11} & n_{21} \\ n_{41} & n_{31} & n_{21} & n_{11} \end{bmatrix} / d \quad (5)$$

$n_{11} = E^2 - \beta^2 E^{*2}$ $n_{21} = 4F_1 P$ $n_{31} = -2F_2(E - \beta E^*)$ $n_{41} = -2P(E + E^*)$ $d = E^2 + \beta^2 E^{*2} - 2P^2 - 2F_1 F_2$ $\beta = \exp(2j\phi_f)$ In Equation (5), $F_1$, $F_2$, P, and E are constituent polynomials in the variable $s=j\omega$, where $\omega$ is frequency. $\beta$ and admittance-matrix parameters $n_{11}$, $n_{21}$, $n_{31}$, and $n_{41}$ are intermediate variables of convenience. d is the denominator of the admittance matrix Y. j is the imaginary unit, and $\phi_f$ is the phase of the leading coefficient of polynomial F. Where $F_1$ and $F_2$ are distinct, $\phi_f$ is the average of the phases $\phi_{f1}$ and $\phi_{f2}$ of the leading coefficients of polynomials $F_1$ and $F_2$ (i.e., $2j\phi_f = j(\phi_{f1} + \phi_{f2})$).

The admittance matrix Y in Equation (5) can be expanded according to its residuals and thus be thought of as the parallel connection of N+1 four-port sub-networks, or layers, each one realizing an elementary 4×4 admittance network:

$$Y_e = \begin{bmatrix} K_{11} + \sum \frac{r_{11k}}{(s-jp_k)} & K_{21} + \sum \frac{r_{21k}}{(s-jp_k)} & K_{31} + \sum \frac{r_{31k}}{(s-jp_k)} & K_{41} + \sum \frac{r_{41k}}{(s-jp_k)} \\ K_{21} + \sum \frac{r_{21k}}{(s-jp_k)} & K_{11} + \sum \frac{r_{11k}}{(s-jp_k)} & K_{41} + \sum \frac{r_{41k}}{(s-jp_k)} & K_{31} + \sum \frac{r_{31k}}{(s-jp_k)} \\ K_{31} + \sum \frac{r_{31k}}{(s-jp_k)} & K_{41} + \sum \frac{r_{41k}}{(s-jp_k)} & K_{11} + \sum \frac{r_{11k}}{(s-jp_k)} & K_{21} + \sum \frac{r_{21k}}{(s-jp_k)} \\ K_{41} + \sum \frac{r_{41k}}{(s-jp_k)} & K_{31} + \sum \frac{r_{31k}}{(s-jp_k)} & K_{21} + \sum \frac{r_{21k}}{(s-jp_k)} & K_{11} + \sum \frac{r_{11k}}{(s-jp_k)} \end{bmatrix} \quad (6)$$

Figure 16:
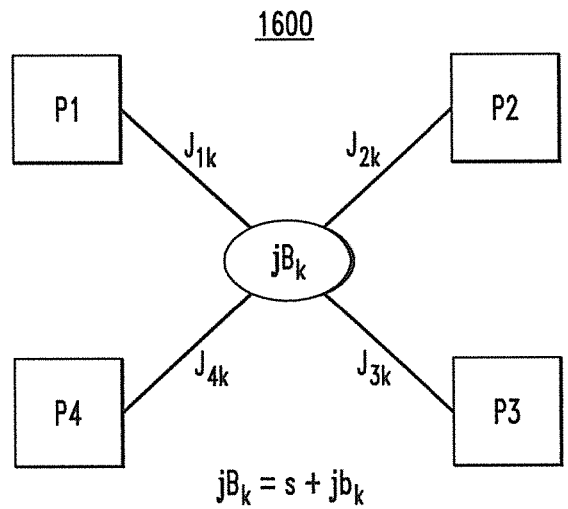
FIG. 16 is a frequency-variant, four-port network of degree one for constructing admittance matrix Y.

The building blocks for the expanded admittance matrix $Y_e$ are of two kinds. One kind of building block is the frequency-variant, four-port network 1600 of degree one, as shown in the routing diagram depicted in FIG. 16. In FIG. 16, the blocks labeled P1 through P4 respectively represent ports 1, 2, 3, and 4 of four-port network 1600. The lines represent admittance inverters, each with a parameter $J_k$ that is related (in Equation (8) below) to a corresponding r value appearing in the diagonal elements of the expanded admittance matrix $Y_e$ in Equation (6) above. In one embodiment, where $Y_e$ is highly symmetric, each one of $J_{1k} = J_{2k} = -J_{3k} = J_{4k}$ is equal to $+/-r_{11k}^{0.5}$ for each layer k. The central node with parameter $jB_k$ in FIG. 16 is a lowpass resonator having a unitary capacitance with a parallel frequency-invariant susceptance. For convenience, each parenthetical expression $(s-jp_k)$ may be shown as $jB_k$, in FIG. 16, where $jB_k=s+jb_k=s-jp_k$, where $b_k=-jp_k$. For each different layer k, parameter $jB_k$ is the sum of the admittances of (i) a unitary capacitance to ground having admittance s, in parallel with (ii) a frequency-invariant susceptance having admittance $jb_k$, different for each k.

Figure 17:
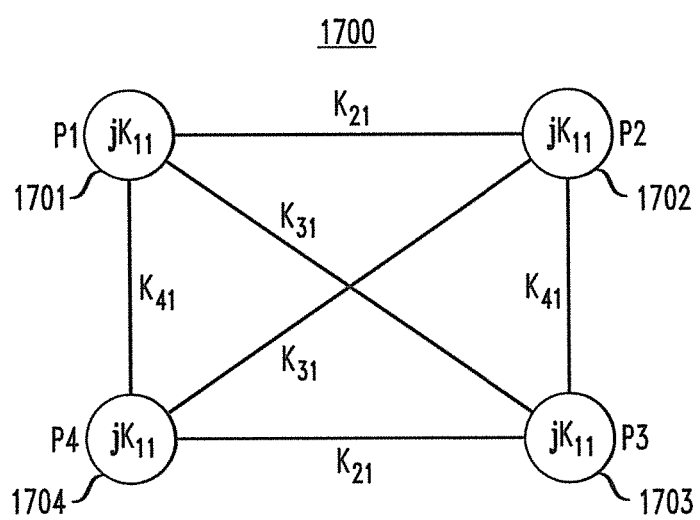
FIG. 17 is a frequency-invariant, four-port network for constructing admittance matrix Y.

The second kind of building block for the expanded admittance matrix $Y_e$ is the frequency-invariant four-port network 1700 having the routing diagram shown in FIG. 17. The four circular nodes 1701, 1702, 1703, 1704 represent ports P1, P2, P3, and P4, respectively, and lines represent couplings. In the general case, the port nodes may include a frequency-invariant susceptance to ground of value $jK_{11}$ to ground. The port nodes 1701-1704 are connected by a network of admittance inverters of values $K_{21}$, $K_{31}$, and $K_{41}$ as shown in FIG. 17. All of the K values are imaginary numbers and are the same as those appearing in the expanded admittance matrix $Y_e$ in Equation (6).

By parallel-connecting k layers of the first kind and one layer of the second kind, the expanded admittance matrix $Y_e$ in Equation (6) above can be constructed, provided that the following conditions hold:

$$\text{sign}(r_{41k}) = \text{sign}(r_{21k})\text{sign}(r_{31k}) \quad (7a)$$

$$|r_{11k}| = |r_{21k}| = |r_{31k}| = |r_{41k}| \quad (7b)$$

$$\phi_f \neq 0 \quad (7c)$$

The condition set forth in Equation (7c) above ensures that the leading coefficient of the common denominator d of the elements in admittance matrix Y is non-zero, so that the degree of common denominator d is not smaller than the degree of any numerator polynomial in admittance matrix Y. If the denominator' degree were larger than a numerator's degree, then the direct terms $K_{ij}$ resulting from residual expansion of admittance matrix Y would not be constant with frequency. Thus, $\phi_f$ cannot be zero.

The values of the circuital parameters $J_{1k}$ through $J_{4k}$ of the N blocks of the first kind are related to the residuals $r_{ik}$ and the poles $p_k$ by the following relations:

$$J_{1k} = \sqrt{r_{11k}}$$

$$J_{2k} = \text{sign}(r_{21k})\sqrt{r_{11k}}$$

$$J_{3k} = \text{sign}(r_{31k})\sqrt{r_{11k}}$$

$$J_{4k} = \text{sign}(r_{41k})\sqrt{r_{11k}}$$

$$b_k = -p_k \quad (8)$$

As described above, $b_k$ is an intermediate parameter of convenience that is equal to $-p_k$ in Equation (6) above. In Equation (8), the conditions set forth in Equations (7a) and (7b) above are employed to fully identify the k-th block of FIG. 16, whose admittance matrix $Y_k$ is:

$$Y_k = \begin{bmatrix} \dfrac{J_{1k}^2}{s+jb_k} & \dfrac{J_{1k}J_{2k}}{s+jb_k} & \dfrac{J_{1k}J_{3k}}{s+jb_k} & \dfrac{J_{1k}J_{4k}}{s+jb_k} \\ \dfrac{J_{1k}J_{2k}}{s+jb_k} & \dfrac{J_{2k}^2}{s+jb_k} & \dfrac{J_{2k}J_{3k}}{s+jb_k} & \dfrac{J_{2k}J_{4k}}{s+jb_k} \\ \dfrac{J_{1k}J_{3k}}{s+jb_k} & \dfrac{J_{2k}J_{3k}}{s+jb_k} & \dfrac{J_{3k}^2}{s+jb_k} & \dfrac{J_{3k}J_{4k}}{s+jb_k} \\ \dfrac{J_{1k}J_{4k}}{s+jb_k} & \dfrac{J_{2k}J_{4k}}{s+jb_k} & \dfrac{J_{3k}J_{4k}}{s+jb_k} & \dfrac{J_{4k}^2}{s+jb_k} \end{bmatrix} \quad (9)$$

with the k-th layer of expanded admittance matrix $Y_e$ in Equation (6).

Once the different layers have been assembled, the expanded admittance matrix $Y_e$ can be expressed as follows:

$$Y_e = G + sC + jM$$

where G, C, and M are real $(N+4) \times (N+4)$ matrices that are given by:

$$G = \begin{bmatrix} 1 & 0 & 0 & 0 & 0 & \cdots & 0 \\ 0 & 1 & 0 & 0 & 0 & \cdots & 0 \\ 0 & 0 & 1 & 0 & 0 & \cdots & 0 \\ 0 & 0 & 0 & 1 & 0 & \cdots & 0 \\ 0 & 0 & 0 & 0 & 0 & \cdots & 0 \\ \vdots & \vdots & \vdots & \vdots & \vdots & \ddots & \vdots \\ 0 & 0 & 0 & 0 & 0 & \cdots & 0 \end{bmatrix}$$

$$C = \begin{bmatrix} 0 & 0 & 0 & 0 & 0 & \cdots & 0 \\ 0 & 0 & 0 & 0 & 0 & \cdots & 0 \\ 0 & 0 & 0 & 0 & 0 & \cdots & 0 \\ 0 & 0 & 0 & 0 & 0 & \cdots & 0 \\ 0 & 0 & 0 & 0 & 1 & \cdots & 0 \\ \vdots & \vdots & \vdots & \vdots & \vdots & \ddots & \vdots \\ 0 & 0 & 0 & 0 & 0 & \cdots & 1 \end{bmatrix}$$

$$M = \begin{bmatrix} K_{11} & K_{21} & K_{31} & K_{41} & J_{11} & \cdots & J_{1N} \\ K_{21} & K_{11} & K_{41} & K_{31} & J_{21} & \cdots & J_{2N} \\ K_{31} & K_{51} & K_{11} & K_{21} & J_{31} & \cdots & J_{3N} \\ K_{41} & K_{31} & K_{21} & K_{11} & J_{41} & \cdots & J_{4N} \\ J_{11} & J_{21} & J_{31} & J_{41} & -p_1 & \cdots & 0 \\ \vdots & \vdots & \vdots & \vdots & \vdots & \ddots & \vdots \\ J_{1N} & J_{2N} & J_{3N} & J_{4N} & 0 & \cdots & -p_k \end{bmatrix}$$

Matrix M above is thus the N+4 transversal coupling matrix of scattering matrix S.

Reduction to Canonic Forms

By applying matrix rotations to the N+4 transversal coupling matrix, several canonic forms can be obtained. Of these forms, four types are here reported:

$$M = \begin{bmatrix} K & K & K & K & J & J & J & \cdots & J \\ K & K & K & K & J & J & J & \cdots & J \\ K & K & K & K & J & J & J & \cdots & J \\ K & K & K & K & J & 0 & 0 & \cdots & 0 \\ J & J & J & J & b_1 & J & 0 & \cdots & 0 \\ J & J & J & 0 & J & b_2 & J & \cdots & 0 \\ J & J & 0 & 0 & 0 & J & b_3 & \ddots & 0 \\ J & J & 0 & 0 & 0 & 0 & J & b_4 & \ddots & 0 \\ \vdots & \vdots & \vdots & \vdots & \vdots & \ddots & \ddots & \ddots & J \\ J & J & 0 & 0 & 0 & 0 & 0 & J & b_N \end{bmatrix} \quad \text{TYPE I}$$

-continued $$M = \begin{bmatrix} K & K & K & K & J & J & J & J & \cdots & J \\ K & K & K & K & J & J & J & J & \cdots & J \\ K & K & K & K & J & 0 & 0 & 0 & \cdots & 0 \\ K & K & K & K & J & J & 0 & 0 & \cdots & 0 \\ J & J & J & J & b_1 & J & J & 0 & \cdots & 0 \\ J & J & 0 & J & J & b_2 & J & J & \ddots & 0 \\ J & J & 0 & 0 & J & J & b_3 & J & \ddots & 0 \\ J & J & 0 & 0 & 0 & J & J & b_4 & \ddots & J \\ \vdots & \vdots & \vdots & \vdots & \vdots & \ddots & \ddots & \ddots & \ddots & J \\ J & J & 0 & 0 & 0 & 0 & 0 & J & J & b_N \end{bmatrix}$$ TYPE II $$M = \begin{bmatrix} K & K & K & K & J & J & J & J & \cdots & J \\ K & K & K & K & J & 0 & 0 & 0 & \cdots & 0 \\ K & K & K & K & J & J & 0 & 0 & \cdots & 0 \\ K & K & K & K & J & J & J & 0 & \cdots & 0 \\ J & J & J & J & b_1 & J & J & J & \ddots & 0 \\ J & 0 & J & J & J & b_2 & J & J & \ddots & 0 \\ J & 0 & 0 & J & J & J & b_3 & J & \ddots & J \\ J & 0 & 0 & 0 & J & J & J & b_4 & \ddots & J \\ \vdots & \vdots & \vdots & \vdots & \vdots & \ddots & \ddots & \ddots & \ddots & J \\ J & 0 & 0 & 0 & 0 & 0 & J & J & J & b_N \end{bmatrix}$$ TYPE III $$M = \begin{bmatrix} K & K & K & K & J & 0 & 0 & 0 & \cdots & 0 \\ K & K & K & K & J & J & 0 & 0 & \cdots & 0 \\ K & K & K & K & J & J & J & 0 & \cdots & 0 \\ K & K & K & K & J & J & J & J & \ddots & 0 \\ J & J & J & J & b_1 & J & J & J & \ddots & 0 \\ 0 & J & J & J & J & b_2 & J & J & \ddots & J \\ 0 & 0 & J & J & J & J & b_3 & J & \ddots & J \\ 0 & 0 & 0 & J & J & J & J & b_4 & \ddots & J \\ \vdots & \vdots & \vdots & \ddots & \ddots & \ddots & \ddots & \ddots & \ddots & J \\ 0 & 0 & 0 & 0 & 0 & J & J & J & J & b_N \end{bmatrix}$$ TYPE IV Type I above may be understood as the generalization to the multiport case of a conventional two-port Arrow prototype filter. Type IV above could be seen as the generalization to the multiport case of a conventional two-port folded prototype filter.

In the Types I, II, III, and IV matrices above, indices are dropped for the sake of simplicity. Positions where a non-null coupling could occur are indicated by the letter J.

EXAMPLES

An example with the following parameters is detailed below:

$$zf = [-0.4\ -0.18\ 0.18\ 0.4]*i;$$

$$zp = [0.65\ -0.65]i;$$

$$p = 0.13;$$

$$\phi_f = \pi/2;$$

where zf and zp are the zeros of the characteristic base-filter polynomials $F_n$ and $P_n$, p is a constant related to the return loss RL of the base filter (similar to $\epsilon$ in paragraph 34 above), $\phi_f$ is the same as in Equation (5) above, * is a multiplication operator, and i is the imaginary unit.

The resulting Type IV canonic transversal coupling matrix M for this example is shown below and can be seen to correspond to an eight-resonator, constant-impedance-band (CIB) filter topology shown in FIG. 18.

| 0 | 0 | −1.0000 | 0 | 0.9441 | 0 | 0 | 0 | 0 | 0 | 0 | 0 |
|---|---|---|---|---|---|---|---|---|---|---|---|
| 0 | 0 | 0 | −1.0000 | 0 | 0.9441 | 0 | 0 | 0 | 0 | 0 | 0 |
| −1.0000 | 0 | 0 | 0 | 0 | 0 | 0.9441 | 0 | 0 | 0 | 0 | 0 |
| 0 | −1.0000 | 0 | 0 | 0 | 0 | 0 | 0.9441 | 0 | 0 | 0 | 0 |
| 0.9441 | 0 | 0 | 0 | 0 | 0.1458 | −0.4457 | 0 | 0.3493 | 0 | 0 | 0 |
| 0 | 0.9441 | 0 | 0 | 0.1458 | 0 | 0 | −0.4457 | 0 | −0.3493 | 0 | 0 |
| 0 | 0 | 0.9441 | 0 | −0.4457 | 0 | 0 | 0.1458 | 0 | 0 | 0.3493 | 0 |
| 0 | 0 | 0 | 0.9441 | 0 | −0.4457 | 0.1458 | 0 | 0 | 0 | 0 | −0.3493 |
| 0 | 0 | 0 | 0 | 0.3493 | 0 | 0 | 0 | 0 | 0.3547 | 0 | 0 |
| 0 | 0 | 0 | 0 | 0 | −0.3493 | 0 | 0 | 0.3547 | 0 | 0 | 0 |
| 0 | 0 | 0 | 0 | 0 | 0 | 0.3493 | 0 | 0 | 0 | 0 | 0.3547 |
| 0 | 0 | 0 | 0 | 0 | 0 | 0 | −0.3493 | 0 | 0 | 0.3547 | 0 |

Port 4 can then be terminated in a matched load to give the final three-port combiner structure.

Figure 14:
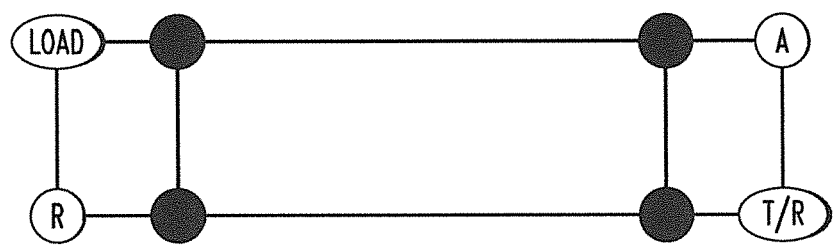
FIG. 14 is a coupling diagram for a four-resonator embodiment of the four-port combiner of FIG. 3.
Figure 15:
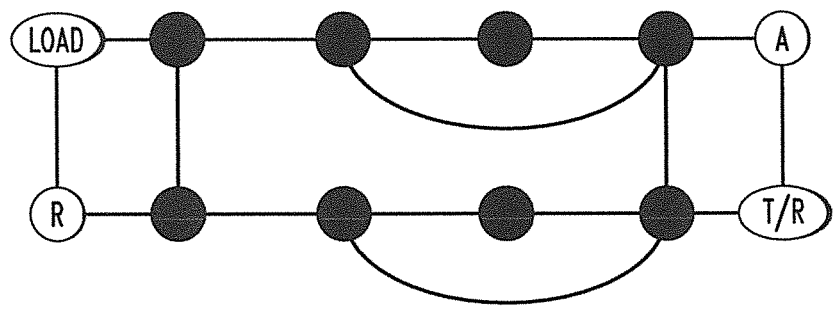
FIG. 15 is a coupling diagram for an eight-resonator embodiment of the four-port combiner of FIG. 3.
Figure 18:
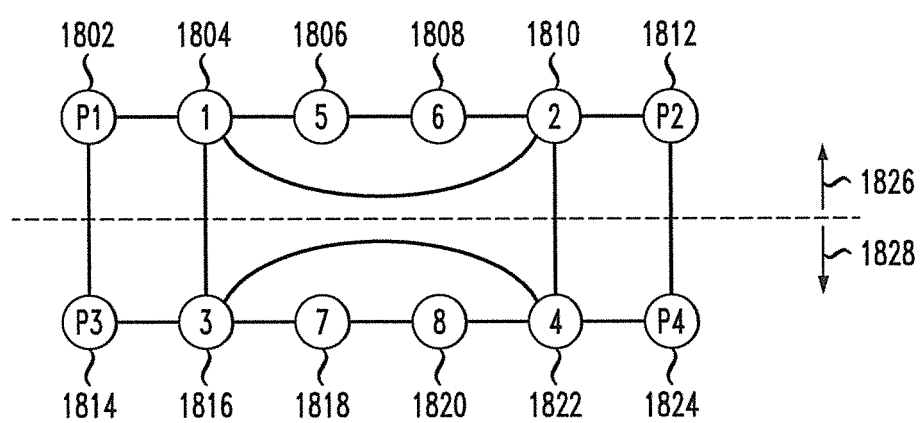
FIG. 18 is a routing diagram for another eight-resonator embodiment of the four-port combiner of FIG. 3.

FIG. 18 depicts signal combiner 1800, comprising eight coupled resonators 1804, 1806, 1808, 1816, 1818, 1820, 1822, and 1824 that are (i) arranged in two symmetrical, coupled paths 1826, 1828 between ports 1802, 1812, 1814, and 1824 and (ii) connected in a CIB-style configuration, in which: port 1802 is coupled to port 1814, resonator 1804 is connected to resonator 1816, resonator 1810 is coupled to resonator 1822, port 1812 is coupled to port 1824, resonator 1804 is (cross-) coupled to resonator 1810, and resonator 1816 is (cross-) coupled to resonator 1822. Other quantities of coupled resonators or other cross-coupling variations may also be used. For example, additional embodiments, including six-resonator combiner 700, four-resonator combiner 1400, and eight-resonator combiner 1500 are depicted in FIGS. 7, 14 and 15, respectively.

Figure 7:
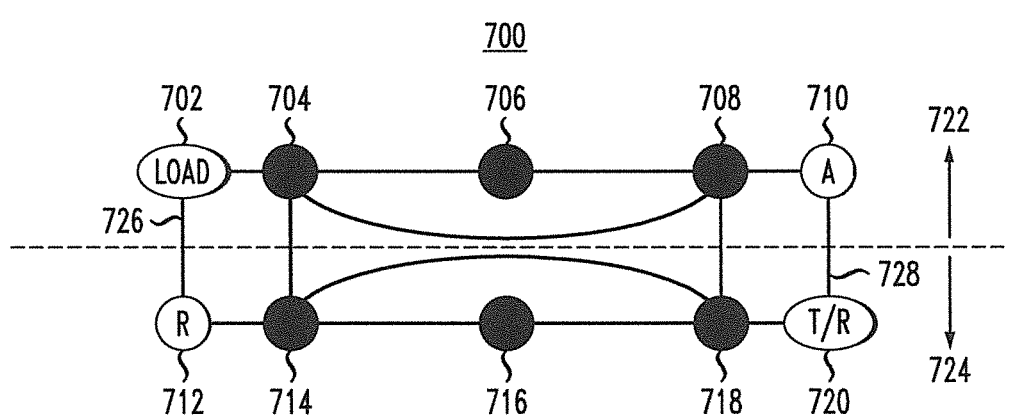
FIG. 7 is a coupling diagram for an embodiment of the four-port combiner of FIG. 3.
Figure 8:
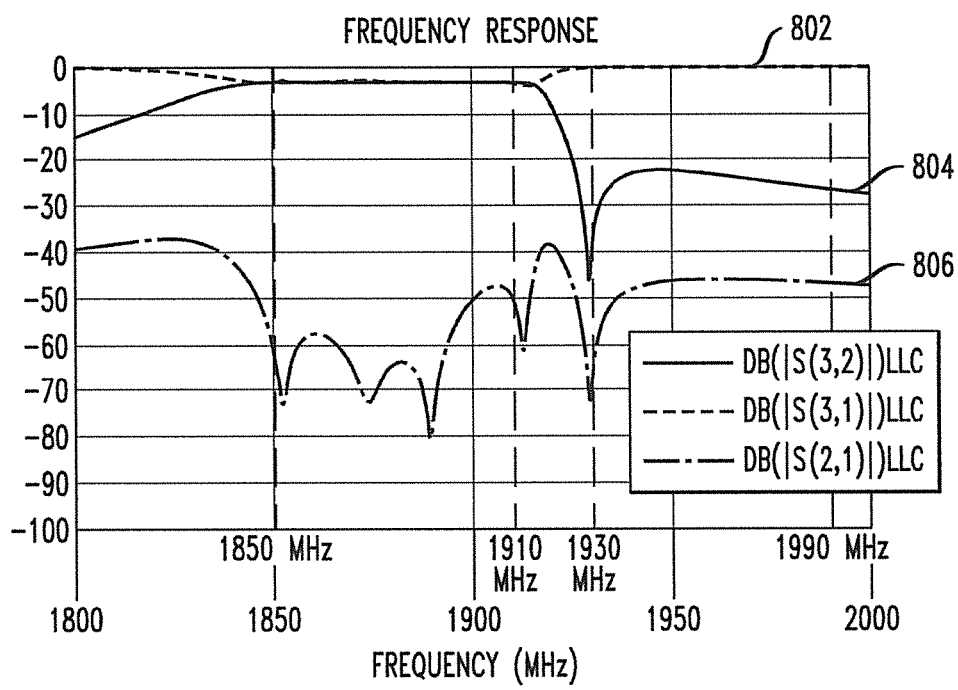
FIG. 8 is a graph showing the simulated frequency response of the combiner embodiment shown in FIG. 7.

FIG. 8 shows the frequency response of six-resonator signal combiner 700 shown in FIG. 7. In FIG. 8, the dashed line 802 is the path from port A to port T/R, the solid line 804 is the path from port R to port A, and the long-and-short-dashed line 806 is the isolation curve for the path from port R to port T/R.

Comparison Between the Two Approaches

Below is a comparison between simulated results obtained in accordance with the conventional approach and in accordance with the novel method described above, when the filter quality Q0 is equal to 3000 for both configurations.

R-to-A Path

Figure 9:
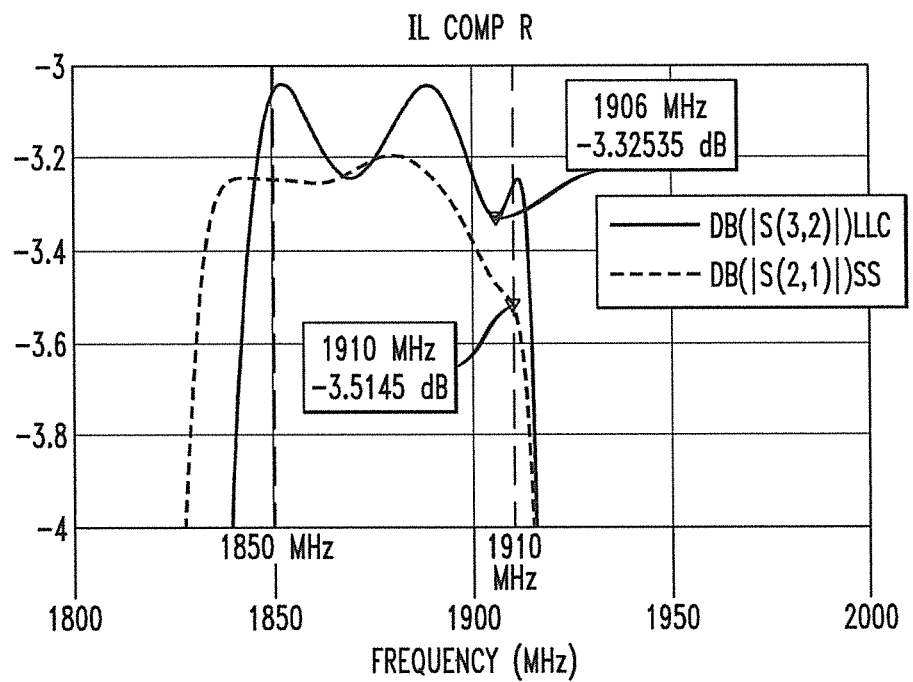
FIG. 9 is a graph showing the simulated return loss of the combiner embodiment shown in FIG. 7.

FIG. 9 shows that the insertion loss of filter 700 of FIG. 7 (shown as a solid trace in FIG. 9) is about 0.2 dB better than the insertion loss of filter 500 of FIG. 5 (shown as a dashed trace in FIG. 9) for the path from port R to port A. For example, at a frequency of 1906 MHz, filter 700 has an insertion loss of about −3.3 dB, while filter 500 has an insertion loss of about −3.5 dB at a frequency of 1910 MHz. (In FIG. 9, the horizontal axis represents frequency in megahertz, while the vertical axis represents insertion loss in decibels.)

T/R-to-A Path

FIG. 10 shows that the insertion loss from port T/R to port A in the new approach (shown as a dashed trace in FIG. 10) is about 0.4 dB better in the RX band, and about 0.25 dB better in the TX band, in comparison with the corresponding insertion losses in the conventional approach (shown as a solid trace in FIG. 10). For example, at a frequency of 1910 MHz, filter 700 has an insertion loss of about −3.45 dB, while filter 500 has an insertion loss of about −3.89 dB. And at a frequency of 1930 MHz, filter 700 has an insertion loss of about −0.19 dB, while filter 500 has an insertion loss of about −0.44

T/R-to-R Path

FIG. 11 shows that isolation is good in both cases, but isolation in the RX band in the conventional case (shown as a long-short-dashed trace in FIG. 11) is limited by the RX filters' return-loss level. On the other hand, the new approach needs accurate tuning and assembly to get good isolation values, especially in the RX band. Such tuning and assembly, however, is well within the skill of one of ordinary skill in the art using conventional manufacturing techniques.

Implementation

Figure 12:
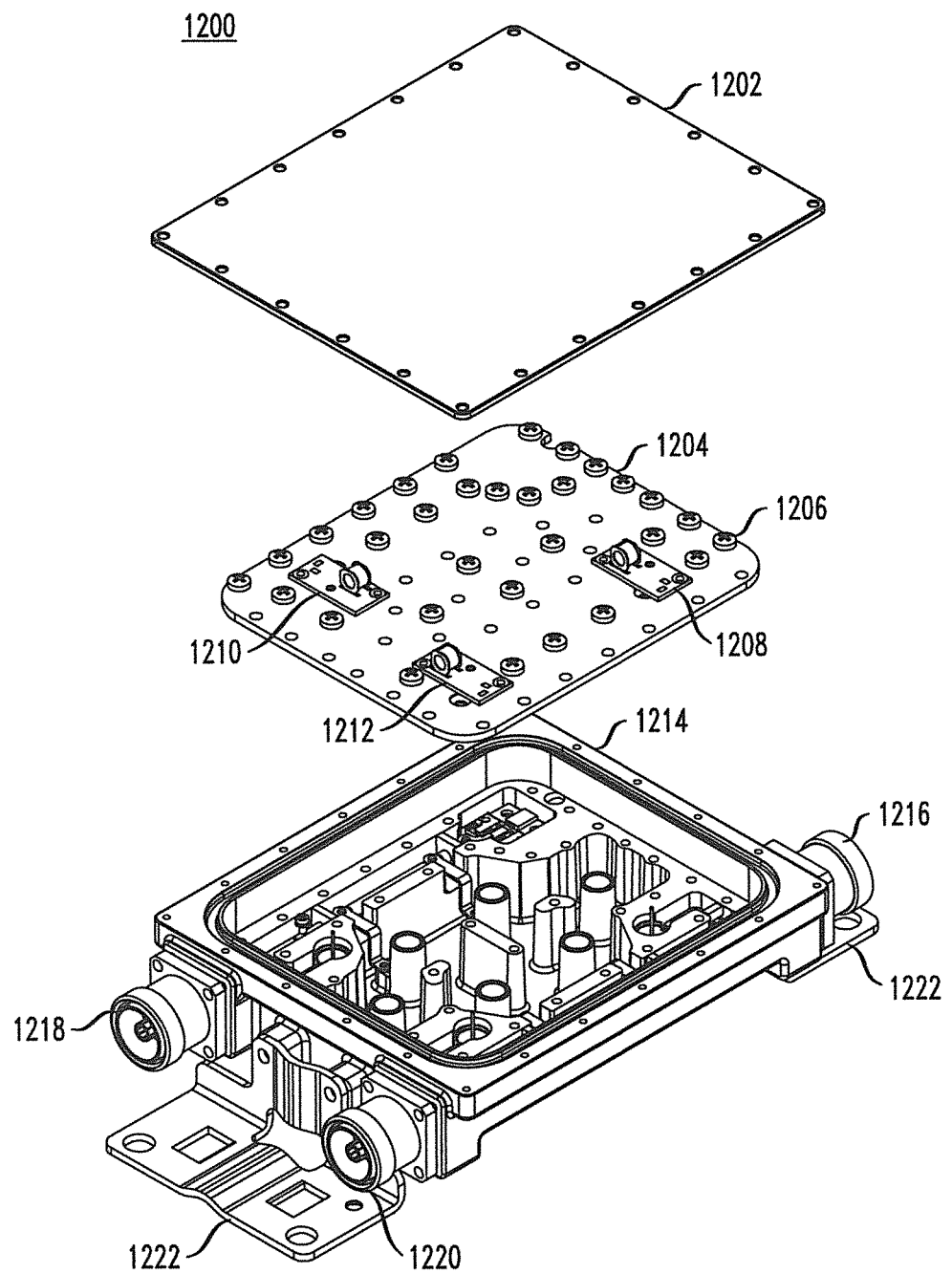
FIG. 12 is an isometric view depicting a physical implementation of the combiner embodiment shown in FIG. 7.

FIG. 12 is an isometric view depicting signal combiner 1200, which is a physical implementation of six-resonator filter 700 of FIG. 7. Combiner 1200 comprises cover plate 1202 and screw plate 1204 having screws 1206 and lightning-protection devices 1208, 1210, and 1212, which may be, e.g., gas-tube discharge devices. Combiner 1200 further comprises filter body 1214 connected to A-port 1216, R-port 1218, and T/R-port 1220. In the embodiment shown in FIG. 12, ports 1216, 1218, and 1220 are coaxial terminals. Lightning-protection devices 1208, 1210, and 1212 are located close to ports 1216, 1218, and 1220, respectively, and are electrically connected to them. Combiner 1200 also comprises mounting and grounding brackets 1222.

Figure 13:
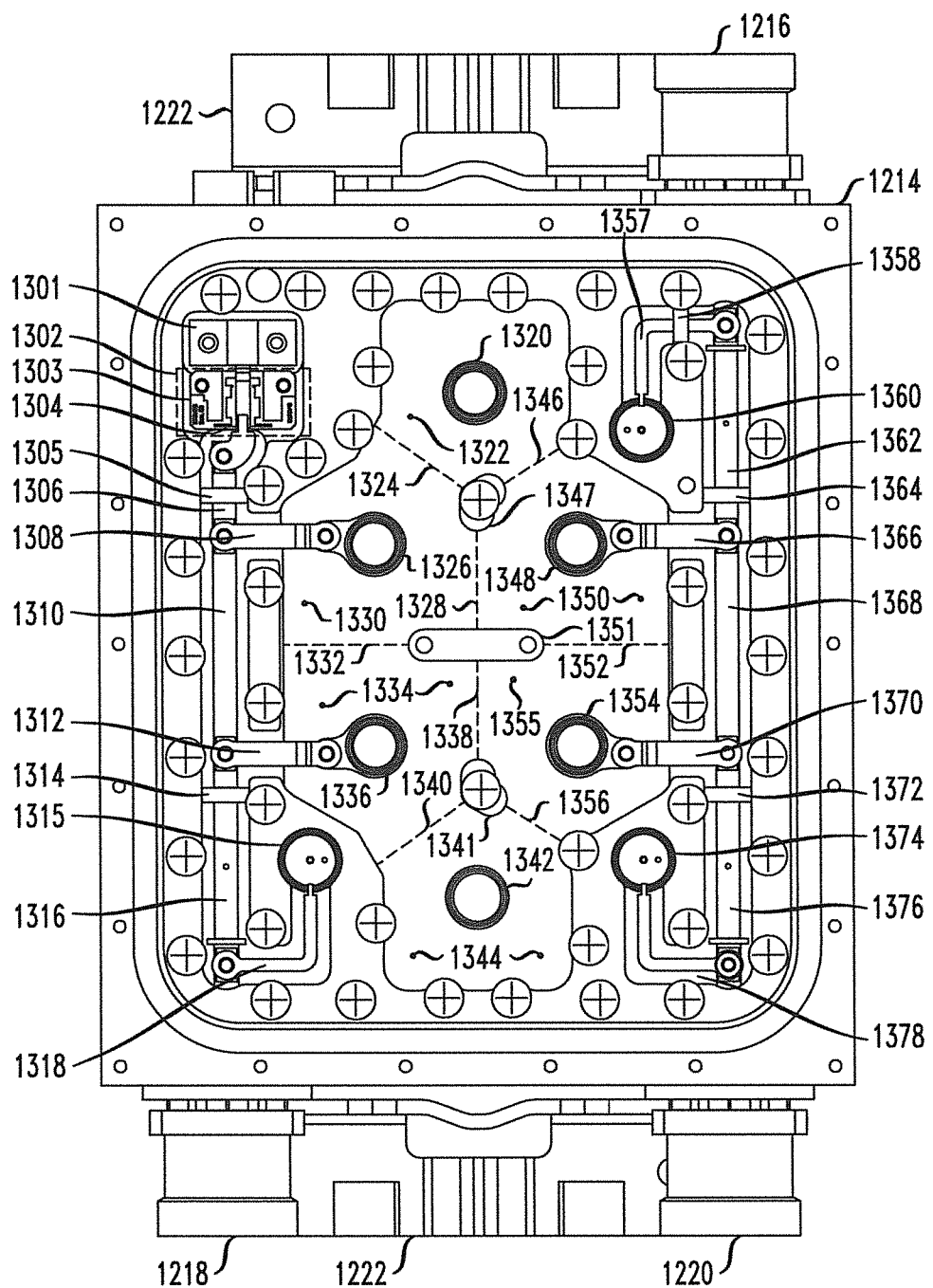
FIG. 13 is a plan view of the combiner embodiment shown in FIG. 12.

FIG. 13 is a plan view of signal combiner 1200, which comprises six resonators 1320, 1326, 1336, 1342, 1348, and 1354, each of which is centered within a corresponding one of resonating chambers 1322, 1330, 1334, 1344, 1350, and 1355 formed within filter body 1214, in conjunction with wall portions 1347, 1351, and 1341. Adjacent resonating chambers are coupled by coupling windows 1324, 1328, 1332, 1338, 1340, 1346, 1352, and 1356, which are sized to achieve the desired scattering parameters for combiner 1200. The coupling windows shown in FIG. 13 directly correspond to the couplings between the resonators shown in FIG. 7. In one embodiment, the coupling windows are relatively large, in order to achieve a relatively wide bandwidth for combiner 1200.

With further reference to FIG. 13, 50-ohm load module 1302 is coupled to R-port 1218 by a first transmission line formed by coupling sections 1306, 1310, and 1316. Similarly, A-port 1216 is coupled to T/R-port 1220 by a second transmission line formed by coupling sections 1462, 1468, and 1476. Coupling sections 1310, 1316, 1462, 1468, and 1476 are 90-degree, 50-ohm distributed, quarter-wavelength transmission-line sections made of brass or other metal or conductive material. The first and second transmission lines are coupled to resonators 1326, 1336, 1348, and 1354 (corresponding to resonators 704, 714, 708, and 718, respectively) by taps 1308, 1312, 1366, and 1370, which are similarly made of brass or other conductive material. Taps 1308, 1312, 1366, and 1370 are connected to the first and second transmission lines, e.g., by screws, rivets, or solder. The first and second transmission lines are supported by insulating bushings 1305, 1314, 1364, and 1372.

Each of resonators 1320, 1326, 1336, 1342, 1348, and 1354 is implemented as a coaxial resonating tube or other resonator, such as an acoustic resonator. Each resonator may be provided with a tuning screw located over an open-circuited end of the resonator. The capacitance of each resonator and thereby the resonator's resonant frequency may be adjusted by adjusting the tuning screw. By properly controlling the resonant frequencies of the resonators, the bandwidth and the location of the TX and RX bands of the combiner can be adjusted over a relatively wide range of frequencies.

A-port 1216, R-port 1218, and T/R-port 1220 are also connected to respective lightning-protection devices 1208, 1210, and 1212 by taps 1318, 1357, and 1378 connected to tube-shaped distributed capacitances 1315, 1360, and 1374.

50-ohm load module 1302 comprises 50-ohm, surface-mount resistor 1304 on circuit board 1303. One end of resistor 1304 is connected to coupling section 1306 of the first transmission line, and another end of resistor 1304 is connected to ground (i.e., filter body 1214) by connector 1301.

CONCLUSION

In conclusion, the new approach offers better insertion-loss performances in both TX and RX bands, with reduced size, weight, and cost of the combiner, and with a 50-percent reduction in the number of cavities and therefore also in the volume of the combiner.

TERMINOLOGY

For purposes of this description, the term "signal combiner" refers to any device known in the art or later developed that combines two electrical signals into one composite signal. Because a signal combiner in certain embodiments may also operate as a splitter (e.g., to split a combined electrical signal from an antenna into two separate electrical signals), the term "signal combiner" as used herein also encompasses a signal splitter.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

I claim:

1. A signal combiner comprising:
a first port configured to receive a first input signal comprising first and second receive bands and to transmit a first output signal comprising a transmit band;
a second port configured to output a second output signal comprising the first receive band;
a third port configured to output a third output signal comprising the second receive band and to receive a second input signal that is to be transmitted from the first port as the first output signal;
a load forming a fourth port in a four-port network comprising the first, second, and third ports;
a plurality of resonators within a plurality of chambers arranged in a constant-impedance-bandwidth configuration;
a first transmission line coupling the first and third ports to each other and to a first resonator of the plurality of resonators; and
a second transmission line coupling the second port and the load to each other and to at least a second resonator of the plurality of resonators different from the first resonator.

2. The signal combiner of claim 1, wherein:
the resonators and chambers have a structure based on filter parameters that are determined based on a scattering matrix having constituent polynomials $F_1$ and $F_2$ and
constituent polynomials $F_1$ and $F_2$ are different and are determined based on characteristic polynomials of a prototype base filter.

3. The signal combiner of claim 2, wherein the prototype base filter is one of a low-pass filter, a bandpass filter, a bandpass-reject filter, a stop-band filter, a high-pass filter, a high-pass reject filter, a Type I low-pass Tchebycheff equiripple filter, an inverse-Tchebycheff filter, a Butterworth lowpass filter, a Tchebycheff Type II lowpass filter, and an elliptic filter.

4. The signal combiner of claim 1, wherein: the resonators and chambers have a structure based on filter parameters that are determined based on a scattering matrix S specified according to the following equation:

$$S = \begin{pmatrix} 0 & 0 & F_1 & P \\ 0 & 0 & P & F_2 \\ F_1 & P & 0 & 0 \\ P & F_2 & 0 & 0 \end{pmatrix} / E,$$

where $F_1$, $F_2$, P, and E are constituent polynomials in the variable $s=\omega$, $\omega$ being frequency, and the constituent polynomials $F_1$, $F_2$, P, and E are determined based on characteristic polynomials of a prototype base filter.

5. The signal combiner of claim 4, wherein the constituent polynomials $F_1$, $F_2$, P, and E are computed from $F_n$, $P_n$, and $E_n$, using the following equations:

$$F_n = j^{-N} \prod_{i=1}^{N} (s - zr_i) = j^{-N} \prod_{i=1}^{N} (s + zr_i^*)$$

$$P_n = j^{-N_p} \prod_{i=1}^{N_p} (s - zt_i) = j^{-N_p} \prod_{i=1}^{N_p} (s + zt_i^*)$$

$$E_n = j^{-N} \prod_{i=1}^{N} (s - p_i),$$

where N is the base-filter degree, $N_p$ is the number of transmission zeros of the base filter, $\{p_i\}$ is the set of poles of the base filter (with i=1, ..., N), $\{zr_i\}$ is the set of reflection zeros (with i=-1, ..., N), $\{zt_i\}$ is the set of transmission zeros (with i=1, ..., $N_p$), $\epsilon$ is a constant related to the return loss RL of the base filter, $F_n$, $P_n$, and $E_n$ are the characteristic polynomials of the base filter, and the operator * is the complex paraconjugate operator; and $F_1 = F_n + P_n/\epsilon$ $F_2 = F_n - P_n/\epsilon$ $P = \alpha P_n/\epsilon$ and $|E|^2 = (F_n + \sqrt{1+\alpha^2} P_n/\epsilon)(F_n - \sqrt{1+\alpha^2} P_n/\epsilon)$ with $$\alpha = \sqrt[4]{\frac{1}{1 - 10^{-RL/10}}}.$$

6. The signal combiner of claim 1, wherein the first port is connected to the second port by a first path having an insertion loss in the first and second receive bands that is less than 4 dB.

7. The signal combiner of claim 1, wherein the first port is connected to the third port by a second path having an insertion loss in the first and second receive bands that is less than 4 dB.

8. The signal combiner of claim 1, wherein the second port and the third port are connected by a third path having an insertion loss in the transmit band and in the first and second receive bands that is at least a 30 dB, such that the second port and the third port are substantially isolated from each other in the transmit band and the receive bands.

9. The signal combiner of claim 1, wherein: the first port is connected to the second port by a first path having an insertion loss in the first and second receive bands that is less than 4 dB; the first port is connected to the third port by a second path having an insertion loss in the first and second receive bands that is less than 4 dB; and the second port and the third port are connected by a third path having an insertion loss in the transmit band and in the first and second receive bands that is at least 30 dB, such that the second port and the third port are substantially isolated from each other in the transmit band and the receive bands.

10. The signal combiner of claim 1, wherein the second output signal from the second port comprises both the first receive band and the second receive band.

11. The signal combiner of claim 1, wherein the third output signal from the third port comprises both the first receive band and the second receive band.

12. A wireless base station comprising: first user equipment configured for wireless communication according to a first wireless protocol; second user equipment configured for wireless communication according to a second wireless protocol; a signal combiner according to claim 1, connected to both the first user equipment and the second user equipment; and an antenna unit connected to the signal combiner.

13. A method for designing and constructing a three-port signal combiner, the method comprising:
determining a four-port scattering matrix S based on predetermined filter characteristics;
determining an expanded admittance matrix $Y_e$;
determining a transversal coupling matrix based on the expanded admittance matrix $Y_e$;
re-arranging the transversal coupling matrix to produce a filter-parameter matrix conforming to a four-port coupled-resonator filter topology;
selecting physical parameters of a four-port resonant-cavity filter, based on the filter-parameter matrix; and
constructing the four-port resonant-cavity filter having the selected physical parameters, wherein one of the four ports of the four-port resonant-cavity filter is suitable for connection to a load, such that, when the load is connected, the four-port resonant-cavity filter operates as a three-port signal combiner.

14. The method of claim 13, wherein the four-port scattering matrix comprises constituent polynomials $F_1$ and $F_2$ that are different and are determined based on characteristic polynomials of a prototype base filter.

15. The method of claim 14, wherein the prototype base filter is one of a low-pass filter, a bandpass filter, a bandpass-reject filter, a stop-band filter, a high-pass filter, a high-pass reject filter, a Type I low-pass Tchebycheff equi-ripple filter, an inverse-Tchebycheff filter, a Butterworth lowpass filter, a Tchebycheff Type II lowpass filter, and an elliptic filter.

16. The method of claim 13, further comprising: connecting a predetermined load to one of the ports of the four-port resonant-cavity filter, thus converting the four-port resonant-cavity filter to a three-port signal combiner.

17. The method of claim 13, wherein the four-port coupled-resonator filter topology is a constant-impedance-band configuration.

18. The method of claim 13, wherein the four-port scattering matrix S is specified according to the following equation:

$$S = \begin{pmatrix} 0 & 0 & F_1 & P \\ 0 & 0 & P & F_2 \\ F_1 & P & 0 & 0 \\ P & F_2 & 0 & 0 \end{pmatrix} / E,$$

where $F_1$, $F_2$, P, and E are constituent polynomials in the variable $s = j\omega$, $\omega$ being frequency, and the constituent polynomials $F_1$, $F_2$, P, and E are determined based on characteristic polynomials of a prototype base filter.

19. The method of claim 18, wherein the constituent polynomials $F_1$, $F_2$, P, and E are computed from $F_n$, $P_n$, and $E_n$ using the following equations:

$$F_n = j^{-N} \prod_{i=1}^{N} (s - zr_i) = j^{-N} \prod_{i=1}^{N} (s + zr_i^*)$$

$$P_n = j^{-N_p} \prod_{i=1}^{N_p} (s - zt_i) = j^{-N_p} \prod_{i=1}^{N_p} (s + zt_i^*)$$

$$E_n = j^{-N} \prod_{i=1}^{N} (s - p_i),$$

where N is the base-filter degree, $N_p$ is the number of transmission zeros of the base filter, $\{p_i\}$ is the set of poles of the base filter (with i=1, ..., N), $\{zr_i\}$ is the set of reflection zeros (with i=1, ..., N), $\{zt_i\}$ is the set of transmission zeros (with i=1, ..., $N_p$), $\epsilon$ is a constant related to the return loss RL of the base filter, $F_n$, $P_n$, and $E_n$ are the characteristic polynomials of the base filter, and the operator * is the complex para-conjugate operator; and $$F_1 = F_n + P_n/\epsilon$$

$$F_2 = F_n - P_n/\epsilon$$

$$P = \alpha P_n/\epsilon$$

and $$|E|^2 = (F_n + \sqrt{1+\alpha^2} P_n/\epsilon)(F_n - \sqrt{1+\alpha^2} P_n/\epsilon)$$

with $$\alpha = \sqrt[4]{\frac{1}{1 - 10^{-RL/10}}}.$$

20. A wireless base station comprising:
first user equipment configured for wireless communication according to a first wireless protocol;
second user equipment configured for wireless communication according to a second wireless protocol;
a signal combiner constructed according to claim 13, connected to both the first user equipment and the second user equipment; and an antenna unit connected to the signal combiner.

* * * * *

UNITED STATES PATENT AND TRADEMARK OFFICE
CERTIFICATE OF CORRECTION

PATENT NO.        : 9,755,292 B2                              Page 1 of 1
APPLICATION NO.   : 15/117839
DATED             : September 5, 2017
INVENTOR(S)       : Tamiazzo It is certified that error appears in the above-identified patent and that said Letters Patent is hereby corrected as shown below:

On the Title Page

(30) Foreign Application Priority Data: Please correct "BO2014A0214" to read -- BA2014A000214 --

In the Specification

Column 9, Line 10: Please correct "($s$-0.5051+0.02050$i$)" to read -- ($s$-0.5051+1.0205$i$) --

Column 10, Line 61: Please correct "parameter $J_k$ that" to read -- parameter $J_{nk}$ that --

Column 12, Line 35: Please correct the second entry, the third line of M= matrix "$K_{51}$" to read -- $K_{41}$ --

In the Claims

Column 19, Line 21: Please correct "(with i=-1, . . . . , N), {$zt_i$}) is" to read -- (with i=1, . . . . , N), {$zt_i$} is --

Signed and Sealed this
Fourth Day of September, 2018

Andrei Iancu
*Director of the United States Patent and Trademark Office*